US008217331B2

(12) United States Patent
Weaver et al.

(10) Patent No.: US 8,217,331 B2
(45) Date of Patent: Jul. 10, 2012

(54) ELECTROMAGNETIC INTERFERENCE-RESISTANT CONTROL DEVICE

(75) Inventors: Thomas L. Weaver, Webster Groves, MO (US); Charles E. Morris, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 12/689,490

(22) Filed: Jan. 19, 2010

(65) Prior Publication Data

US 2011/0174960 A1 Jul. 21, 2011

(51) Int. Cl.
*H03K 17/78* (2006.01)
*H03K 17/687* (2006.01)
(52) U.S. Cl. .................... 250/214 SW; 977/742
(58) Field of Classification Search ........... 250/214 SW; 977/742, 932; 327/427; 200/61.02; 359/486
See application file for complete search history.

(56) References Cited

U.S. PATENT DOCUMENTS

2007/0081242 A1* 4/2007 Kempa et al. ................. 359/486
2009/0322669 A1* 12/2009 Bryning et al. ............... 345/107

OTHER PUBLICATIONS

Chen, Y.C. et al. "Ultrafast optical switching properties of single-wall carbon nanotube polymer composites at 1.55μm." Applied Physics Letters, vol. 81, No. 6, pp. 975-977, Aug. 5, 2002.
Durkop, T. "Properties and applications of high-mobility semiconducting nanotubes." J. Phys: Condens Matter 16 (2004) R553-R580.
Ebbesen, T.W. et al. "Electrical conductivity of individual carbon nanotubes." Nature, vol. 382, pp. 54-56, Jul. 4, 1996.
Kim, Changwook et al. "Effect of electric field on the electronic structures of carbon nanotubes." Applied Physics Letters, vol. 79, No. 8, pp. 1187-1189, Aug. 20, 2001.
Li, Jing et al. "Nano Chemical Sensors With Polymer-Coated Carbon Nanotubes." IEEE Sensors Journal, vol. 6, No. 5, pp. 1047-1051, Oct. 2006.
Lou, L. et al. "Fullerene nanotubes in electric fields." Physical Review B, vol. 52, No. 3, pp. 1429-1432, Jul. 15, 1995.
Peng, Shu et al. "Carbon Nanotube Chemical and Mechanical Sensors." Conference Paper for the 3rd International Workshop on Structural Health Monitoring, Jul. 2001.
Rochefort, Alain et al. "Switching behavior of semiconducting carbon nanotubes under an external electric field." Jun. 22, 2001.

* cited by examiner

*Primary Examiner* — Seung C Sohn
(74) *Attorney, Agent, or Firm* — Charles L. Moore; Moore & Van Allen PLLC

(57) ABSTRACT

An EMI-resistant control device for providing a control signal may include an optical glass fiber connector housing adapted to be connectable to an apparatus for providing the control signal to the apparatus for controlling operation thereof. The EMI-resistant control device may also include a carbon nanotube optical switch mounted in the optical glass fiber connector housing. The carbon nanotube optical switch may include a plurality of light sensitive carbon nanotubes adapted to connect a voltage source to an output of the EMI-resistant control device in response to an optical signal being received by the optical glass fiber connector housing. The optical glass fiber connector housing directs the optical signal onto the plurality of light sensitive carbon nanotubes. The voltage source provides the control signal to the apparatus.

20 Claims, 4 Drawing Sheets

ELECTROMAGNETIC INTERFERENCE-RESISTANT CONTROL DEVICE

FIELD

The present disclosure relates to control devices and control devices for controlling switching of electrical power, and more particularly to an electromagnetic interference (EMI) resistant control device for controlling an electrical power switching apparatus or other device.

BACKGROUND

Aircraft and other vehicles are being designed to use more subsystems and components that are operated by electrical energy or power. For example more electric motors and actuators are being used and in some instances replacing hydraulic components for operating flight control systems and other systems. Designers are looking for more electrically efficient subsystems and trying to reduce weight and volume of systems while at the same time improving range and optimizing use of energy. The typical electrical switching apparatus used in aircraft use electrical current to provide control signals for switching. Copper signal wiring is fed directly to single devices or to multiple devices packaged into a single module. This wire is subject to degradation and failure of the control signal's quality when exposed to electromagnetic pulse environments. Additionally, the weight of individual copper signal wires with required grounding and shielding running throughout the aircraft for each motor or device needing control can add considerable weight.

Existing designs are heavier, not only for the weight of the wire distribution system, but also clamps and other associated hardware (circuit breakers, etc.) required to support the electrical circuitry for the signal side of the control circuitry. Additionally, where shielding is required to protect against electromagnetic effects even more weight is required. Another issue is that once a system with shielded cables has been put in use, determining if the shields are completely intact can be very challenging. The shields must be completely intact if they are to function properly.

Optical signals are also sometimes used, in a configuration in which the control signals are sent optically close to where they will be used, and then converted into electrical signals by receivers made of photodiodes followed by transimpedance amplifiers. This approach using optical fibers mitigates one electromagnetic vulnerability, but adds a new one. The optical fibers are inherently immune to electromagnetic effects, and so do not require shielding. However, photodiodes are extremely sensitive to radio frequency electromagnetic energy and so must be placed in carefully shielded enclosures. In addition, all entrances to the enclosure, such as for the optical fiber bringing the signal, must be designed to be waveguides-beyond-cutoff for any anticipated frequency of radio frequency energy, and all electric power connections for the photodiode and amplifier must be carefully filtered. Additionally, such photonic control systems require high gain photonic signals. This requires higher powered laser sources for the photonic power. Lasers in these higher power ranges are necessarily larger taking up more volume and are less energy efficient.

Accordingly, there is a need for more electrically efficient subsystems for aircraft and other vehicles that are more resistant to electromagnetic effects and that also have reduced weight and volume to improve range and optimal use of energy.

SUMMARY

In accordance with an embodiment, an EMI-resistant control device for providing a control signal may include an optical glass fiber connector housing adapted to be connectable to an apparatus for providing the control signal to the apparatus for controlling operation thereof. The EMI-resistant control device may also include a carbon nanotube optical switch mounted in the optical glass fiber connector housing. The carbon nanotube optical switch may include a plurality of light sensitive carbon nanotubes adapted to connect a voltage source to an output of the EMI-resistant control device in response to an optical signal being received by the optical glass fiber connector housing. The optical glass fiber connector housing directs the optical signal onto the plurality of light sensitive carbon nanotubes to connect the voltage source to the output. The voltage source provides the control signal to the apparatus.

In accordance with another embodiment, an electrical power switching system may include an electrical power switching apparatus. The system may also include an EMI-resistant control device for providing a control signal to control operation of the electrical power switching apparatus for selectively applying a predetermined voltage or electrical power for operation of an electrical device. The EMI-resistant control device may include a carbon nanotube optical switch. The carbon nanotube optical switch may include a plurality of light sensitive carbon nanotubes adapted to connect a voltage source to an output of the EMI-resistant device in response to an optical signal being received by the EMI-resistant control device. The voltage source provides the control signal to cause the electrical power switching apparatus to turn on and to apply the predetermined voltage or electrical power to the electrical device for operation of the device.

In accordance with another embodiment, an electrical power switching system may include an electrical power switching apparatus for connecting a predetermined voltage or electrical power to an electrical device for operation of the electrical device. The electrical power switching apparatus may include a multiplicity of electronic switching units. The electronic switching units may be electrically connected together in a predetermined circuit configuration for conducting an electric current through the electrical power switching apparatus having a substantially higher amplitude than each individual electronic switching unit is capable of conducting and for connecting the predetermined voltage or electrical power to the electrical device. The predetermined voltage or electrical power may have an amplitude substantially higher than each individual electronic switching unit is capable of conducting. The electrical power switching system may also include an optical trigger associated with the electrical power switching apparatus. The optical trigger is adapted to receive an optical signal to trigger the electrical power switching apparatus to turn on the electrical power switching apparatus and to connect the predetermined voltage or electrical power to the electrical device for operation of the electrical device.

In accordance with another embodiment, a method for providing a control signal may include receiving an optical signal by an EMI-resistant control device. The method may also include directing the optical signal on a carbon nanotube optical switch. The carbon nanotube optical switch may include a plurality of light sensitive carbon nanotubes. The light sensitive carbon nanotubes may be adapted to connect a voltage source to an electrical power switching apparatus. The voltage source provides the control signal for operation of the electrical power switching apparatus.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings.

The following detailed description of embodiments refers to the accompanying drawings, which illustrate specific embodiments of the disclosure. Other embodiments having different structures and operations do not depart from the scope of the present disclosure.

DESCRIPTION

The following detailed description of embodiments refers to the accompanying drawings, which illustrate specific embodiments of the disclosure. Other embodiments having different structures and operations do not depart from the scope of the present disclosure.

Figure 1:
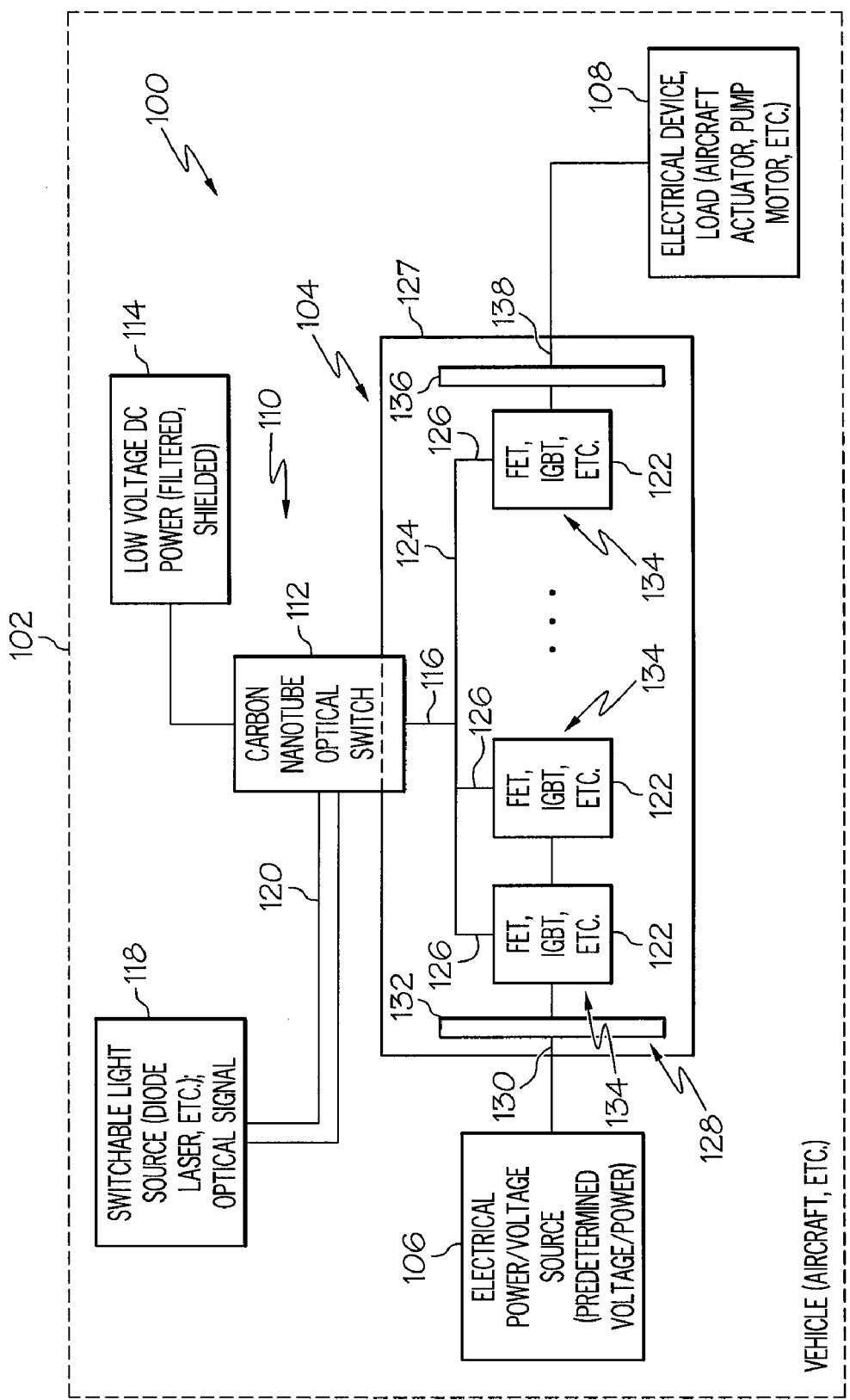
FIG. 1 is a block schematic diagram of an example of an electric power switching system in accordance with an embodiment of the present disclosure.

FIG. 1 is a block schematic diagram of an example of an electric power switching system 100 in accordance with an embodiment of the present disclosure. The electric power switching system 100 may be mounted in a vehicle 102, such as an aerospace vehicle, aircraft, terrestrial vehicle, or watercraft, or may be used in other applications where EMI-resistant switching control, reduced weight and volume and efficient energy usage may be desired, as will become apparent from reading the present disclosure. The electric power switching system 100 may include an electrical power switching apparatus 104. As described in more detail herein, the electrical power switching apparatus 104 may be adapted to connect an electrical power source 106 or voltage source of a predetermined voltage amplitude or electrical power to an electrical device 108 or load for operation thereof. The electrical device 108 may be an actuator, pump, motor or other electrical or electromechanical device operable on the vehicle 102. An example of an electrical power switching apparatus that may be used for the electrical power switching apparatus 104 will be described with reference to FIG. 3.

The electric power switching system 100 may also include an electromagnetic interference (EMI) resistant control device 110. As described in more detail herein, the EMI-resistant control device 110 may provide a control signal to control operation of the electrical power switching apparatus 104 for selectively coupling the electrical power or voltage source 106 to the electrical device 108 to supply the predetermined voltage or electrical power to the electrical device 108 for operation of the electrical device 108.

The EMI-resistant control device 110 may include a carbon nanotube optical switch 112. An example of an EMI-resistant control device including a carbon nanotube optical switch that may be used for the EMI-resistant control device 110 will be described in more detail with reference to FIG. 2. Briefly, the carbon nanotube optical switch 112 may include a plurality of light sensitive carbon nanotubes. The light sensitive carbon nanotubes are adapted to connect a voltage source 114 to an output 116 of the EMI-resistant control device 110 or carbon nanotube optical switch 112 in response to an optical signal being received by the EMI-resistant control device 110. The optical signal may be generated by a light source 118 or optical source. The light source 118 may be a switchable light source capable of being switched on and off in a selected pattern or frequency to control operation of the electrical power switching apparatus 104. The light source 118 may be a lower output or intensity laser, such as diode laser or similar light source. The light source 118 may have a lower output, gain or intensity relative to the higher power or gain laser sources required for conventional photonic drive circuitry using photodiodes or other photo detectors requiring high gain optical signals because of the properties of a light sensitive coating on the carbon nanotubes. For example, the diode laser of light source 118 may generate about one milliwatt peak optical power whereas high gain laser sources for conventional photonic drive circuitry require multiple tens of watts peak optical power to do the same task.

An optical waveguide 120, such as a fiber optic bus or similar optical transmission medium, may transmit the optical signal from the light source 118 or diode laser to the carbon nanotube optical switch 112. The optical waveguide 120 may be adapted to have a radio frequency (RF) cutoff frequency of, for example, about 100 GHz (gigahertz) to block penetration of all electromagnetic energy with frequencies less than about 100 GHz and thus provide resistance to EMI or electromagnetic energy (EME) by the control device 110.

The optical waveguide 120 or fiber optic bus permit elimination or substantial reduction of conductive or copper signal and control wiring and electromagnetic shielding associated with such wiring as well as the packaging to contain the wiring and shielding. The optical waveguide 120 or fiber optic bus may substantially replace such wiring components and circuitry in vehicles, such as aircraft. Optical waveguides or fiber optic bus connections, such as optical waveguide 120 may be routed from the optical signal source 118 through the aircraft distribution system up to the point of the actual electrical device, load or motor 108. The optical or light signal and optical control bus or waveguide 120, as well as, the EMI-resistant control device 110 including the carbon nanotube optical switch 112 to which the optical control bus or waveguide 120 is connected do not require shielding to protect them from degradation or failure from the vehicle 102 or aircraft operating within environments of electromagnetic pulse activity. For example, even up to electromagnetic pulse levels of possible field strengths of about 2000 volts/meter.

The voltage source 114 may be a direct current (DC) voltage. The voltage source 114 provides the control signal or voltage control signal to cause the electrical power switching apparatus 104 to turn on and to apply the predetermined voltage or electrical power 106 to the electrical device 108 for operation of the device 108. The voltage source 114 may be a relatively low amplitude or level DC voltage sufficient enough to turn on or activate a multiplicity of electronic switching units 122 of the electrical power switching apparatus 104. The voltage source 114 may be filtered and the connection to the carbon nanotube switch 112 may be shielded to provide resistance to EMI or EME.

Each of the electronic switching units 122 may be a miniature insulated gate bipolar transistor (IGBT), field effect transistor (FET) or other electronic switching unit or device. The output 116 of the EMI-resistant control device 110 or carbon nanotube optical switch 112 may be interconnected by metal traces 124 to a gate 126 or gate terminal of each IGBT, FET or other type electronic switching unit 122 inside a shielding enclosure 127.

As described in more detail herein, the multiplicity of switching units 122 may be electrically connected together in a predetermined circuit configuration 128. For example, the electrical power or voltage source 106 may be connected to a high voltage input 130 of the electrical power switching apparatus 104. The high voltage input 130 may include or may be coupled to an input bus 132 to divide the input voltage and current between multiple rows or chains 134 of electronic switching units 122, where the multiple electronic switching units 122 in each chain 134 allow the chain to control high voltages, and the multiple chains 134 in parallel allow the power switching apparatus 104 to control high currents. Only a single row or chain 134 is illustrated in FIG. 1 for purposes of clarity. The multiple rows or chains of electronic switching units are best illustrated in the exemplary electrical power switching apparatus 300 in FIG. 3. Each of the rows or chains 134 of electronic switching units 122 may be coupled to an output bus 136 and a high voltage output 138 to supply the predetermined voltage or electrical power to the electrical device 108 or load. The predetermined voltage or electrical power has sufficient amplitude to operate the electrical device 108 or load.

Figure 2:
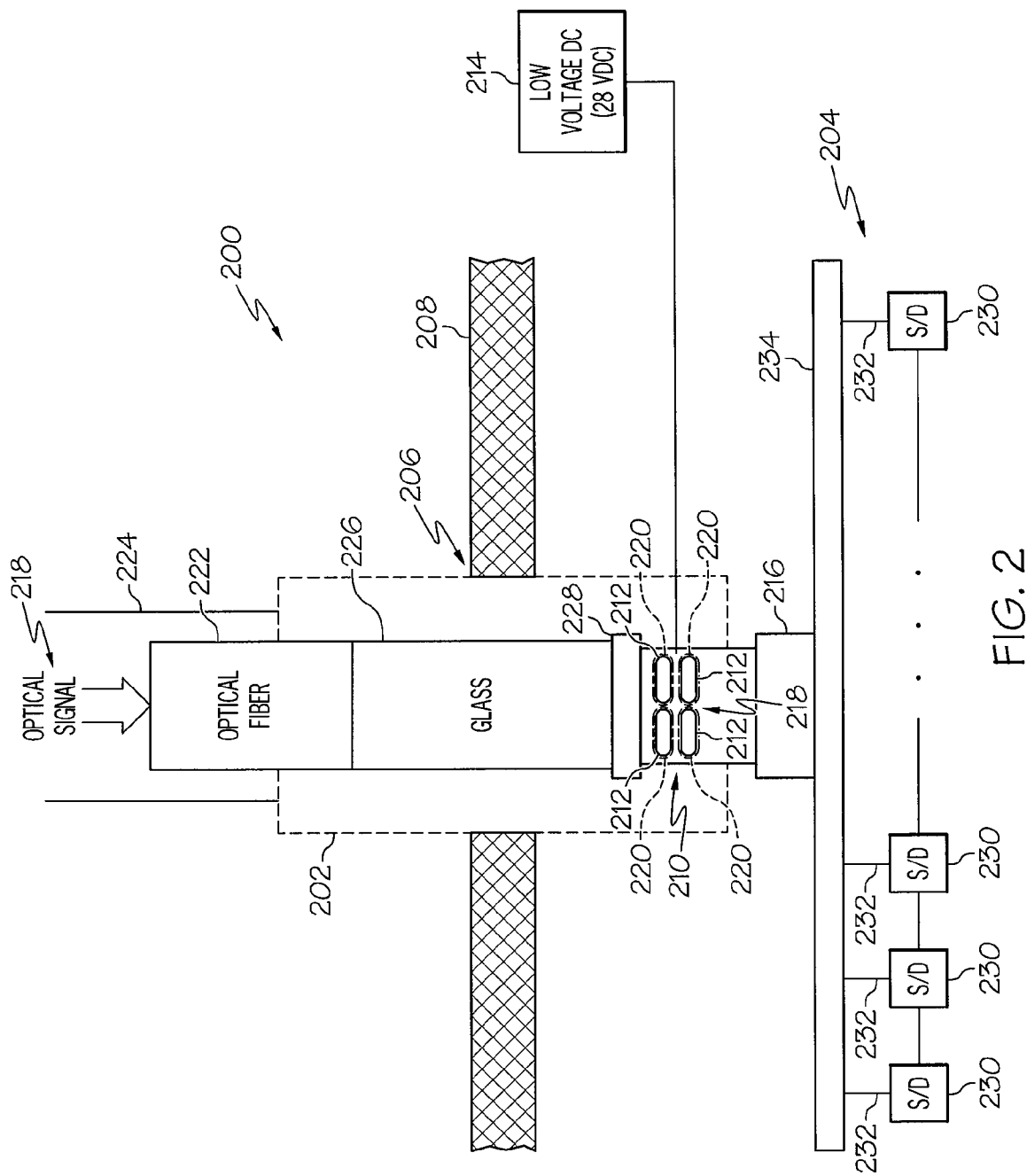
FIG. 2 is a detailed block diagram of an example of an EMI-resistant control device in accordance with an embodiment of the present disclosure.

FIG. 2 is a detailed block diagram of an example of an EMI-resistant control device 200 for providing a control signal in accordance with an embodiment of the present disclosure. The EMI-resistant control device 200 may include an optical glass fiber connector housing 202. The optical glass fiber connector housing 202 may be adapted to be connectable to an apparatus 204 for providing the control signal to the apparatus 204 for controlling operation thereof. For example, the EMI-resistant control device 200 may be inserted into an opening 206 formed in a casing 208, housing or packaging of the apparatus 204. The apparatus 204 may be an electrical power switching apparatus, such as electrical power switching apparatus 104 of FIG. 1 or electrical power switching apparatus 300 of FIG. 3.

The EMI-resistant control device 200 may also include a carbon nanotube optical switch 210 mounted in the optical glass fiber connector housing 202. The carbon nanotube optical switch 210 may include a plurality of light sensitive carbon nanotubes 212. Similar to that previously described, the light sensitive carbon nanotubes 212 are adapted to connect a voltage source 214 to an output 216 of the EMI-resistant control device 200 in response to an optical signal 218 being received by the optical glass fiber connector housing 202. The optical glass fiber connector housing 202 includes a structure to direct the optical signal 218 onto the plurality of light sensitive carbon nanotubes 212. The light sensitive carbon nanotubes 212 then become conductive to connect the voltage source 214 to the apparatus 204 to provide the control signal for operation of the apparatus 204. The apparatus 204 may be an electrical power switching apparatus to conduct electrical power.

The carbon nanotube optical switch 210 may include a supporting matrix 218 for retaining the light sensitive carbon nanotubes 212 for substantially each of the carbon nanotubes 212 to receive a predetermined level of photon energy in the optical signal 218 to cause the light sensitive carbon nanotubes 212 to conduct electrical energy or power.

The light sensitive carbon nanotubes 212 are adapted to be insensitive to electromagnetic radiation of frequencies lower than a frequency of light energy for triggering the light sensitive carbon nanotubes 212 to conduct electric current. Each of the plurality of light sensitive carbon nanotubes 212 may include a coating 220 of molecules of a selected material that changes its electronic configuration in response to light to conduct electrical current but is not affected by radio frequency signals or energy. An example of a light sensitive carbon nanotube similar to that described herein that may be used for the light sensitive carbon nanotubes 212 are those available from Pettit Applied Technologies, Inc. of Gaithersburg, Md.

EMI-resistant control device 200 may also include an optical glass fiber 222 mounted in the optical glass fiber connector housing 202 to receive the optical signal 218 and to transfer the optical signal 218 to the carbon nanotube optical switch 210. The optical glass fiber 222 may extend out of the glass fiber connector housing 222 to receive or interface to an optical waveguide 224 that is releasably attachable to the optical glass fiber connector housing 202 for delivering the optical signal 218 to the optical glass fiber 222. The optical waveguide 222 may be adapted to have a cutoff frequency of, for example, about 100 GHz (gigahertz) so as to block all signals below that frequency.

The EMI-resistant control device 200 may also include an optical transmission medium 226, such as a glass section or tube, or other optical transmission medium, mounted in the optical glass fiber connector housing 202 between the optical glass fiber 222 and the carbon nanotube switch 210. The optical transmission medium 226 may be adapted to transfer the optical signal 218 from the optical glass fiber 222 to the carbon nanotube optical switch 210. An interface 228 may join or bond the optical transmission medium 226 or glass tube to the carbon nanotube optical switch 210 for efficient transmission of the optical signal 218 photon energy to the carbon nanotube optical switch 210 with low loss and reflection of the signal.

The apparatus 204 may be an electrical power switching apparatus. The apparatus 204 may include a multiplicity of electronic switching units 230. Similar to that previously described, each of the electronic switching units 230 may be an IGBT, FET or similar electronic switching device. A gate or gate terminal 232 may be connected to a metal trace 234 or bus which is connected to the output 216 of the carbon nanotube optical switch 210. The source (S) and drain (D) of each adjacent IGBT or FET in a chain or row, such as row or chain 134 in FIG. 1, may be connected in series similar to that previously described. When the optical signal 218 is received by the EMI-resistant control device 200, the carbon nanotube switch 210 closes or conducts to connect the voltage source 214 to the line trace 234. The voltage is then applied to the gate 232 of each switching unit 230, IGBT or FET to activate or close each switching unit 230 to connect an electrical power source or voltage source, such as source 106, to an electrically operated device, such as device 108 in FIG. 1.

Figure 3:
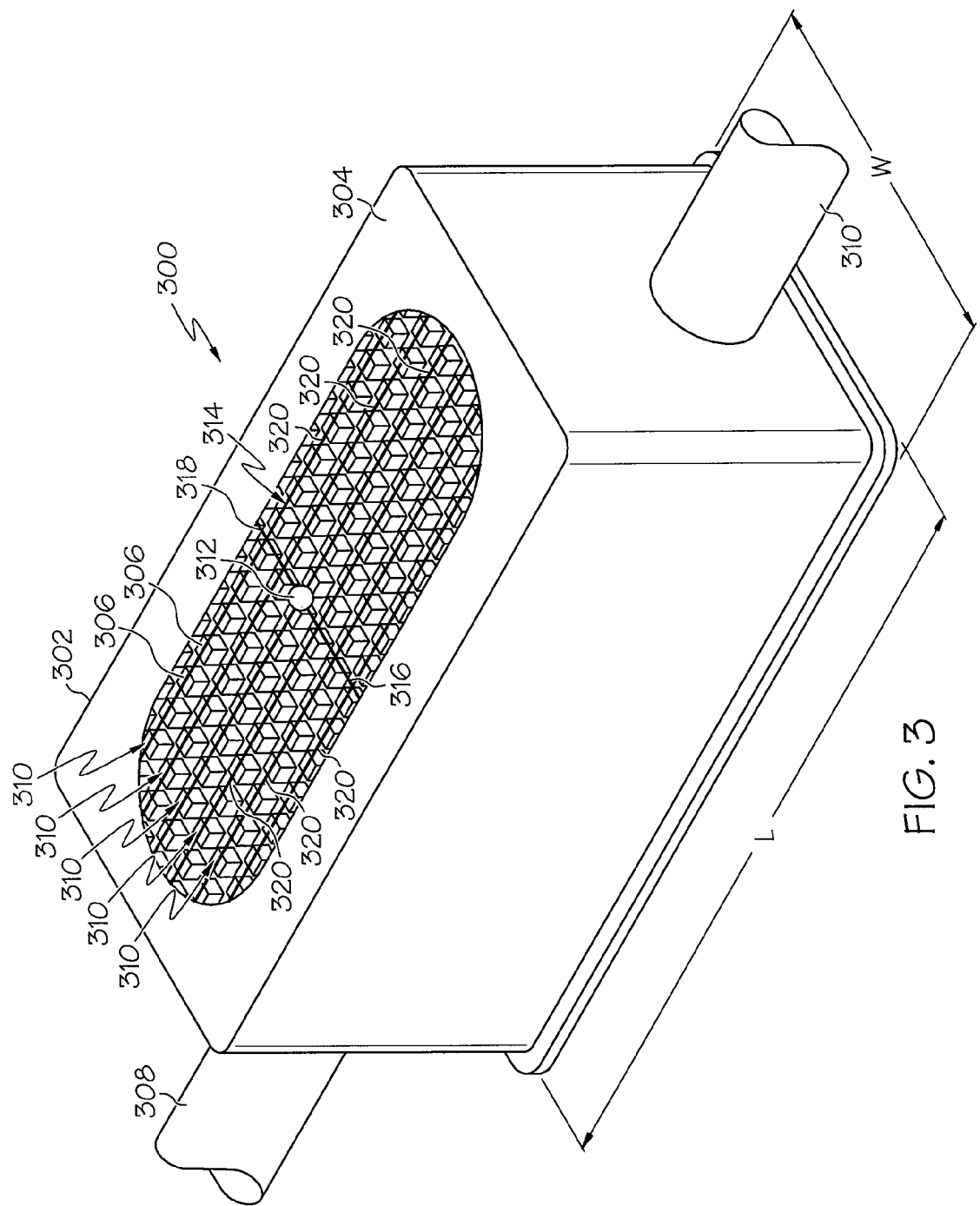
FIG. 3 is an illustration of an example of an electrical switching apparatus controllable by an EMI-resistant control device in accordance with an embodiment of the present disclosure.

FIG. 3 is an illustration of an example of an electrical power switching apparatus 300 controllable by an EMI-resistant control device in accordance with an embodiment of the present disclosure. The electrical power switching apparatus 300 may be used for the electrical power switching apparatus 104 in FIG. 1 or the apparatus 204 in FIG. 2. The electrical power switching apparatus 300 may include a case 302 or housing. The case 302 may be formed from a metallic or dielectric material. The case 302 may be made from or may include an EMI shielding material to provide EMI resistance or reduce EMI affects. The case 302 may be substantially rectangular in shape and may have a predetermined length (L) and width (W). For example, the case 302 may have a length L of about 2 inches and width W of about 1 inch to minimize the volume and weight of the electrical switching apparatus 300.

The case 302 is shown in FIG. 3 with an portion of a top side 304 of the case 302 removed to reveal a multiplicity of miniature electronic switching units 306 enclosed with the case 302. The multiplicity of miniature electronic switching units 306 are substantially completely enclosed within the case 302 when installed in a vehicle, such as the vehicle 102 in FIG. 1.

The electrical power switching apparatus 300 may include an input 308, such as a high voltage or a high power input that may be coupled to an electrical power source or voltage source, such as electrical power or voltage source 106 in FIG. 1. The electrical power switching apparatus 300 may also include an output 310, such as a high voltage or high power output that may be coupled to an electrical device, such as electrical device 108 in FIG. 1.

As previously described, the electrical power switching apparatus 300 may include a multiplicity of electronic switching units 306. The electronic switching units 306 may be electrically connected together in a predetermined circuit configuration 308 for conducting an electric current through the electrical power switching apparatus 300 having a substantially higher amplitude than each individual electronic switching unit 306 is capable of conducting. The predetermined circuit configuration may also permit the electrical power switching apparatus 300 to connect a voltage having an amplitude substantially higher than each individual electronic switching unit 230 is capable of connecting to an electrical device for powering the device. Each electronic switching units 306 may be an IGBT, FET, or other electronic switching device.

The predetermined circuit configuration 308 may include a plurality of chains 310 or rows of electronic switching units 306. The electronic switching units 306 in each chain 310 are connected in series to provide a voltage standoff capacity of a predetermined voltage amplitude. The plurality of chains 310 of the series connected electronic switching units 306 are connected in parallel for the electrical power switching apparatus 300 to provide a current carrying capacity of a predetermined current amplitude. The plurality of chains 310 may be connected in parallel by an electrical connection or bus, similar to connections or buses 132 and 136 in FIG. 1 at opposite ends of each chain 310.

An optical trigger 312 may be positioned proximate to a central location of the predetermined electrical configuration 308 of the multiplicity of electronic switching units 306. The optical trigger 312 may be an EMI-resistant control device similar to the EMI-resistant control device 200 described with reference to FIG. 2.

The electrical power switching apparatus 300 may also include an array of metal traces 314 coupled to the optical trigger 312 to provide a control contact to a gate of each electronic switching unit 306 similar to that described with respect to the electronic switching units 122 and 230 in FIGS. 1 and 2 respectively. The metal traces 314 may include a pair primary metal traces 316 and 318 extending laterally from the optical trigger 312 across the casing 302 to each outermost chain 310 of electronic switching units 306. A plurality of secondary metal traces 320 may extend from the primary metal traces 316 and 318. The secondary metal traces 320 may extend along each chain 310 of series connected electronic switching units 306 to provide the control contact to the gate of each electronic switching unit 306.

As described herein, an electrical power switching system, such as system 100 in FIG. 1 including an EMI-resistant control device, such as device 200 in FIG. 2 may substantially replace conventional electrical or copper signal and control wiring used in many current subsystems in aircraft or any type vehicles. The power switching system 100 and control device 200 would reduce weight and volumes, while providing intrinsic EME resistance compared to current wired subsystems. The EME resistance would be maintained throughout the life of the aircraft or vehicle, because the optic-to-electric signal conversion equipment will be inherently resistant to electromagnetic effects, rather than relying on a shielded enclosure for protection. The inherent resistance comes from the fact that certain carbon nanotube-based systems can be made sensitive to light while maintaining the inherent insensitivity of carbon nanotubes to electromagnetic radiation of frequencies lower than the light which is intended to trigger the system 100.

Additionally, as previously described, prior attempts to create a photonic control solution to electromagnetic effects that can directly cause degradation or failure of control signals to electronics have met with limited success. This has been due to conflicting material properties in the materials and devices which were selected to be applied. Where high gain of the photonic signal was required, this naturally meant use of a higher powered laser source for the photonic power. Lasers in this range of power are necessarily larger and less energy efficient. The EMI-resistant control device 200 and carbon nanotube optical switch 210 overcome the need for high power in the laser source for the photonic drive circuitry since the switching required can be accomplished with low power lasers, such as diode lasers or the like, due to the properties of the nanotube material coatings as described herein. The EMI-resistant control device as described herein also directly couples the photonic switch, which converts the optical signal into an electrical current flow, into the base of a solid state electric switch, such as electrical switching apparatus 300 of FIG. 3 so that this connection can be made with familiar "bonding" processes, used by semiconductor device manufacturers of FETs and IGBTs.

Figure 4:
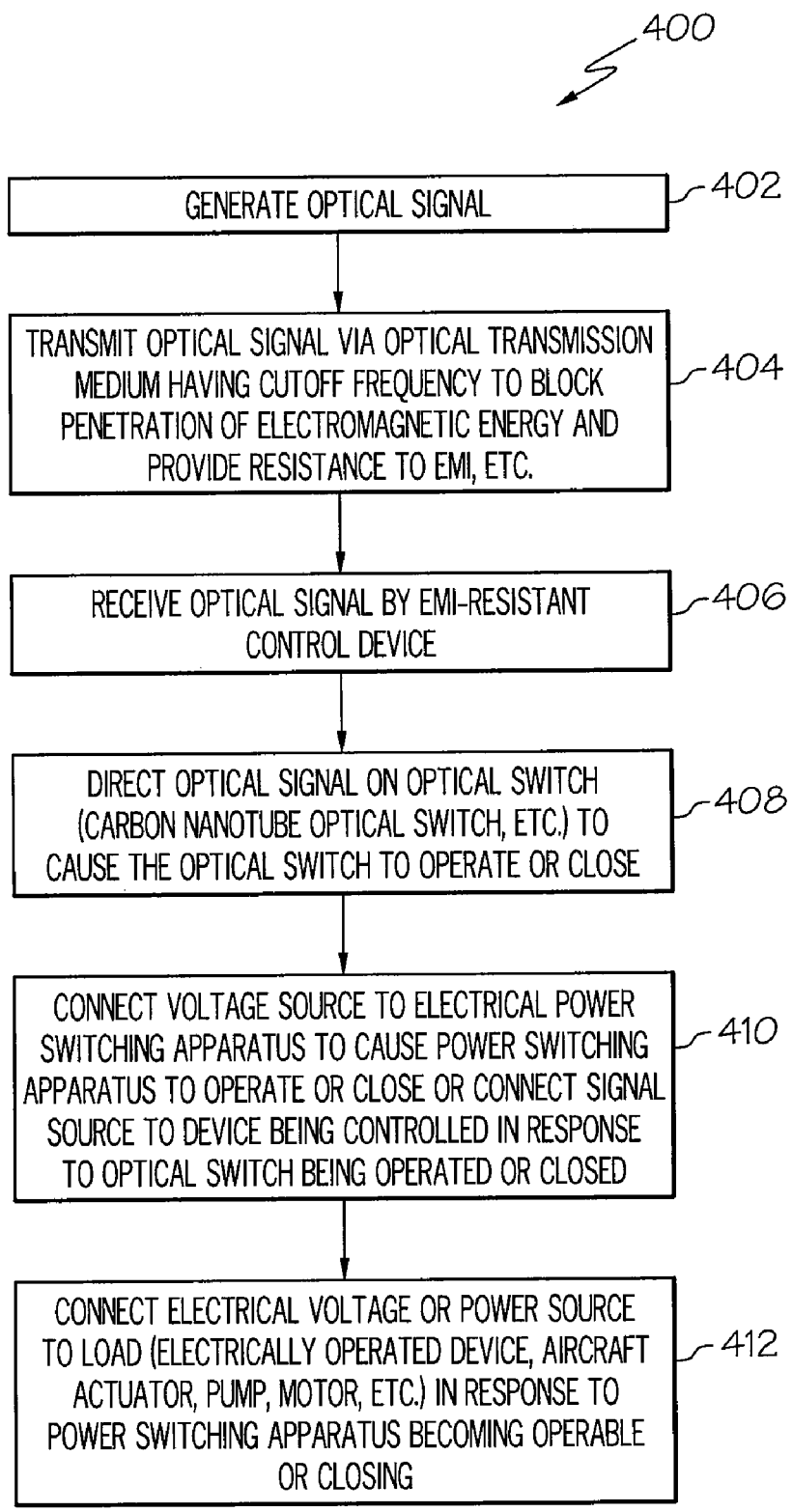
FIG. 4 is a flow chart of an example of a method for providing a control signal in accordance with an embodiment of the present disclosure.

FIG. 4 is a flow chart of an example of a method 400 for providing a control signal in accordance with an embodiment of the present disclosure. The control signal is resistant to EMI or EME. The method 400 may be embodied in or performed by the system 100 of FIG. 1. In block 402, an optical signal may be generated. In block 404, the optical signal may be transmitted via an optical transmission medium having a cutoff frequency to block penetration of electromagnetic energy and provide resistance to electromagnetic interference.

In block 406, the optical signal may be received by an EMI-resistant control device. The EMI-resistant control device may be similar to that described in FIG. 2. In block 408, the optical signal may be directed onto an optical switch to cause the optical switch to operate or close. The optical switch may be a carbon nanotube optical switch housed within the EMI-resistant control device.

In block 410, a voltage source may be connected to an electrical power switching apparatus to cause the electrical power switching apparatus to operate or close in response to the optical switch being operated or closed. In another embodiment, a signal source may be connected to a device or apparatus being controlled in response to the optical switch being operated or closed.

In block 412, an electrical voltage or power source may be connected to a load in response to the electrical power switching apparatus in block 410 becoming operable or closing. The load may be an electrically operated device, and aircraft actuator, pump, motor, or other electrically operated device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. An EMI-resistant control device for providing a control signal, comprising:
   an optical glass fiber connector housing adapted to be connectable to an apparatus for providing the control signal to the apparatus for controlling operation thereof; and
   a carbon nanotube optical switch mounted in the optical glass fiber connector housing, the carbon nanotube optical switch comprising a plurality of light sensitive carbon nanotubes adapted to connect a voltage source to an output of the EMI-resistant control device in response to an optical signal being received by the optical glass fiber connector housing and the optical glass fiber connector housing directing the optical signal onto the plurality of light sensitive carbon nanotubes, the voltage source providing the control signal to the apparatus.

2. The EMI-resistant control device of claim 1, wherein the carbon nanotube optical switch comprises a supporting matrix for retaining the light sensitive carbon nanotubes for substantially each of the carbon nanotubes to receive a predetermined level of photon energy in the optical signal to cause the light sensitive carbon nanotubes to conduct electrical energy.

3. The EMI-resistant control device of claim 2, wherein each of the plurality of light sensitive carbon nanotubes comprise a coating of molecules of a selected material that changes its electronic configuration in response to light to conduct electrical current but is not effected by radio frequency signals.

4. The EMI-resistant control device of claim 1, wherein the light sensitive carbon nanotubes are adapted to be insensitive to electromagnetic radiation of frequencies lower than a frequency of light energy for triggering the light sensitive carbon nanotubes to conduct electric current.

5. The EMI-resistant control device of claim 1, further comprising an optical glass fiber mounted in the optical glass fiber connector housing to receive the optical signal and to transfer the optical signal to the carbon nanotube optical switch.

6. The EMI-resistant control device of claim 5, further comprising an optical waveguide attachable to the optical glass fiber connector housing for delivering the optical signal to the optical glass fiber of EMI-resistant control device to activate the light sensitive carbon nanotubes to conduct electrical energy, wherein the waveguide comprises a cutoff frequency beyond a radio frequency cutoff frequency.

7. The EMI-resistant control device of claim 6, further comprising an optical transmission medium mounted in the optical glass fiber connector between the optical glass fiber and the carbon nanotube switch to transfer the optical signal from the optical glass fiber to the carbon nanotube optical switch.

8. An electrical power switching system, comprising:
   an electrical power switching apparatus; and
   an EMI-resistant control device for providing a control signal to control operation of the electrical power switching apparatus for selectively applying a predetermined voltage or electrical power for operation of an electrical device, the EMI-resistant control device comprising a carbon nanotube optical switch, the carbon nanotube optical switch including a plurality of light sensitive carbon nanotubes adapted to connect a voltage source to an output of the EMI-resistant device in response to an optical signal being received by the EMI-resistant control device, the voltage source providing the control signal to cause the electrical power switching apparatus to turn on and to apply the predetermined voltage or electrical power to the electrical device for operation of the device.

9. The electrical power switching system of claim 8, wherein the electrical power switching apparatus comprises a multiplicity of electronic switching units electrically connected together in a predetermined circuit configuration for conducting an electric current through the electrical power switching apparatus having a substantially higher amplitude than each individual electronic switching unit is capable of conducting and for connecting the predetermined voltage to the electrical device, the predetermined voltage having an amplitude substantially higher than each individual electronic switching unit is capable of connecting.

10. The electrical power switching system of claim 9, wherein each of the multiplicity of switching units comprises one of an insulated gate bipolar transistor or a field effect transistor.

11. The electrical power switching system of claim 9, wherein the predetermined circuit configuration comprises a plurality of chains of electronic switching units, the electronic switching units in each chain being connected in series to provide a voltage standoff capacity of a predetermined voltage amplitude and the plurality of chains of the series connected electronic switching units being connected in parallel for the electrical power switching apparatus to provide a current carrying capacity of a predetermined current amplitude.

12. The electrical power switching system of claim 9, wherein the EMI-resistant control device defines an optical trigger, the optical trigger being positioned proximate to a central location of the predetermined electrical configuration of the multiplicity of electronic switching units and further comprising an array of metal traces coupled to the optical trigger to provide a control contact to a gate of each electronic switching unit.

13. The electrical power switching system of claim 8, wherein the carbon nanotube optical switch comprises a supporting matrix for retaining the light sensitive carbon nanotubes for receiving the optical signal to cause the light sensitive carbon nanotubes to conduct electrical energy.

14. The electrical power switching system of claim 8, wherein each of the plurality of light sensitive carbon nanotubes comprise a coating of a selected material that changes its electronic configuration in response to light to conduct electrical current and is adapted to be insensitive to electromagnetic radiation.

15. The electrical power switching system of claim 8, wherein the electrical device is a component of a vehicle.

16. An electrical power switching system, comprising:
   an electrical power switching apparatus for connecting a predetermined voltage or electrical power to an electrical device for operation of the electrical device, the electrical power switching apparatus comprising a multiplicity of electronic switching units electrically connected together in a predetermined circuit configuration for conducting an electric current through the electrical power switching apparatus having a substantially higher amplitude than each individual electronic switching unit is capable of conducting and for connecting the predetermined voltage or electrical power to the electrical device, the predetermined voltage or electrical power having an amplitude substantially higher than each individual electronic switching unit is capable of conducting; and
   an optical trigger associated with the electrical power switching apparatus adapted to receive an optical signal to trigger the electrical power switching apparatus to turn on and to connect the predetermined voltage to the electrical device for operation of the electrical device.

17. The electrical power switching system of claim 16, wherein the optical trigger comprises an EMI-resistant control device for providing a control signal to control operation of the electrical power switching apparatus for selectively applying a predetermined voltage or electrical power for operation of an electrical device, the EMI-resistant control device comprising a carbon nanotube optical switch, the carbon nanotube optical switch including a plurality of light sensitive carbon nanotubes adapted to connect a voltage source to an output of the EMI-resistant device in response to an optical signal being received by the EMI-resistant control device, the voltage source providing the control signal to cause the electrical power switching apparatus to turn on and to apply the predetermined voltage or electrical power to the electrical device for operation of the device.

18. The electrical power switching system of claim 16, wherein the predetermined circuit configuration comprises a plurality of chains of electronic switching units, the electronic switching units in each chain being connected in series to provide a voltage standoff capacity of a predetermined voltage amplitude and the plurality of chains of the series connected electronic switching units being connected in parallel for the electrical power switching apparatus to provide a current carrying capacity of a predetermined current amplitude.

19. A method for providing a control signal for electrical power switching, comprising:
   receiving a optical signal by an EMI-resistant control device;
   directing the optical signal on a carbon nanotube optical switch, wherein the carbon nanotube optical switch comprises a plurality of light sensitive carbon nanotubes adapted to connect a voltage source to an electrical power switching apparatus, the voltage source providing the control signal for operation of the electrical power switching apparatus.

20. The method of claim 19, further comprising activating the electrical power switching apparatus by connecting the voltage source to each of a multiplicity of electronic switching units of the electrical power switching apparatus, the multiplicity of electronic switching units being electrically connected together in a predetermined circuit configuration for conducting an electric current through the electrical power switching apparatus having a substantially higher amplitude than each individual electronic switching unit is capable of conducting individually and for connecting a predetermined voltage or electrical power to an electrical device for operation thereof, the predetermined voltage or electrical power having an amplitude substantially higher than each individual electronic switching unit is capable of conducting.

* * * * *